Nov. 30, 1965     S. J. POPEIL     3,220,110
FOOD PREPARATION DEVICE
Filed Dec. 26, 1963     3 Sheets-Sheet 1
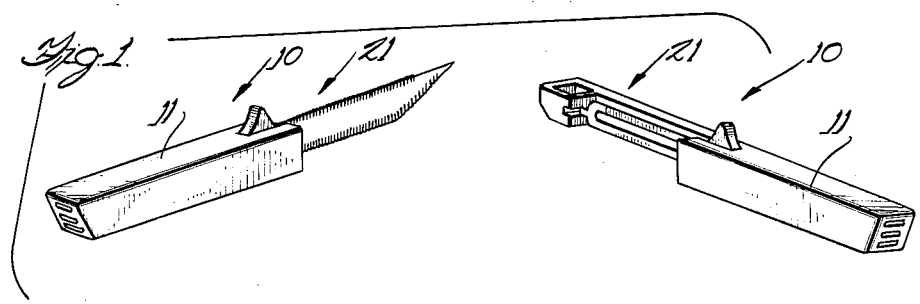
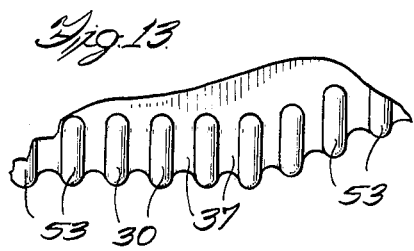
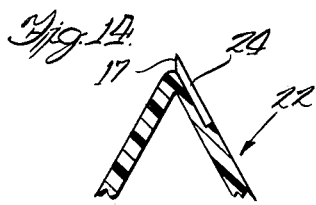
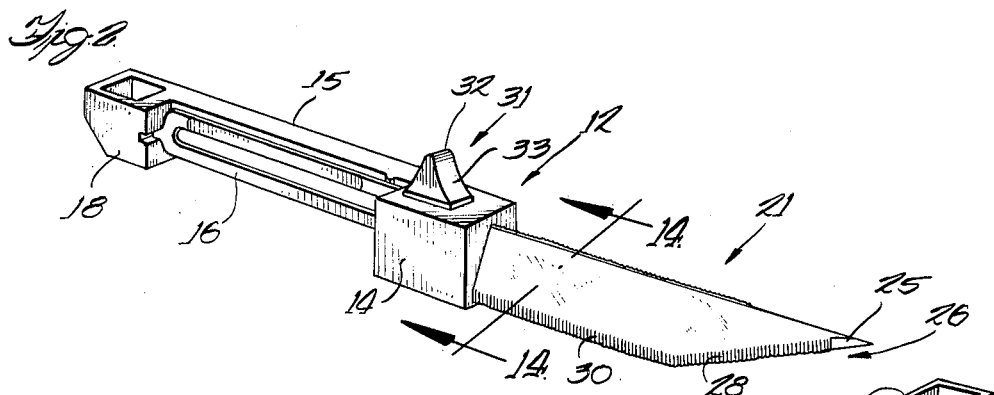
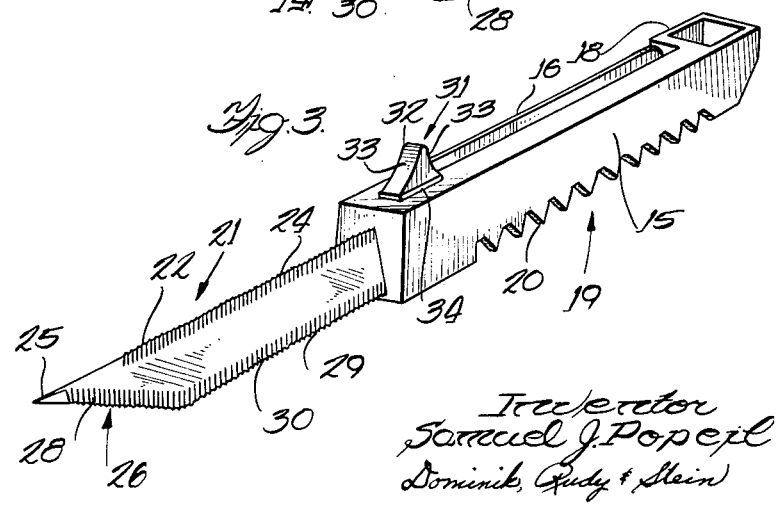

Nov. 30, 1965    S. J. POPEIL    3,220,110
FOOD PREPARATION DEVICE
Filed Dec. 26, 1963    3 Sheets-Sheet 2
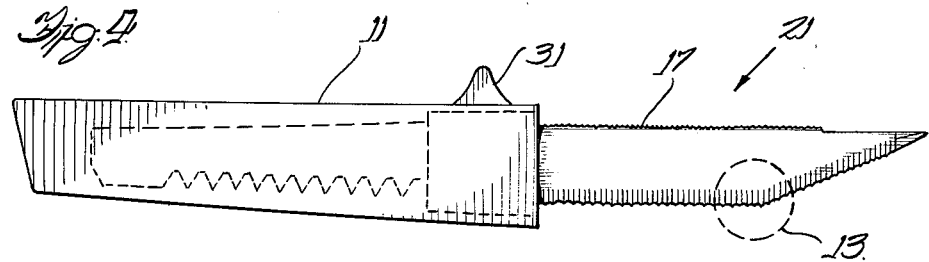
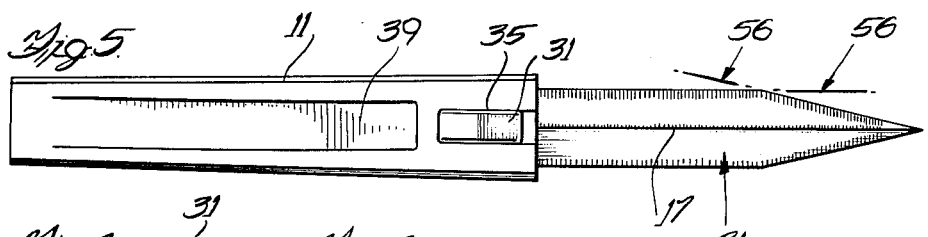
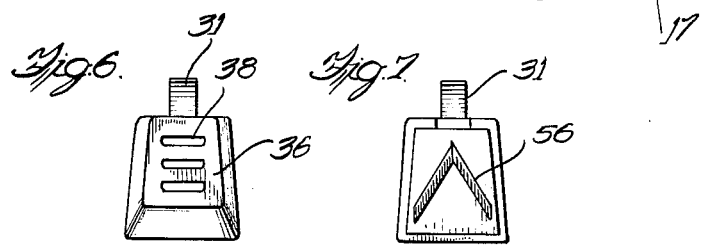
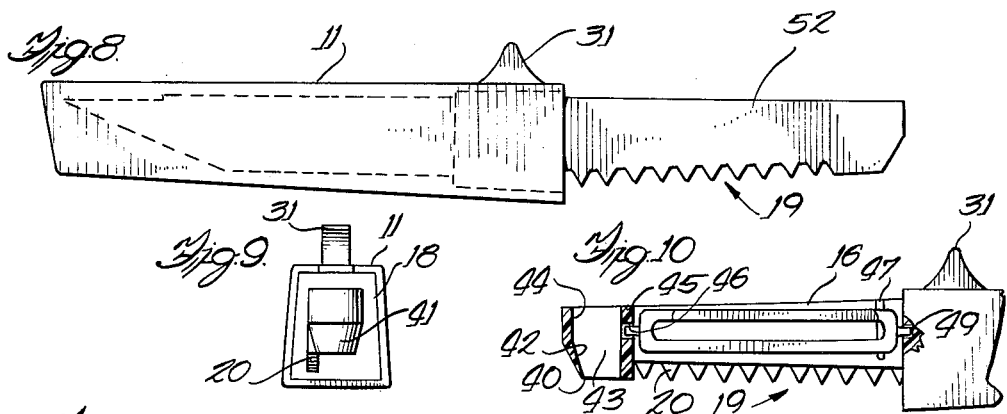
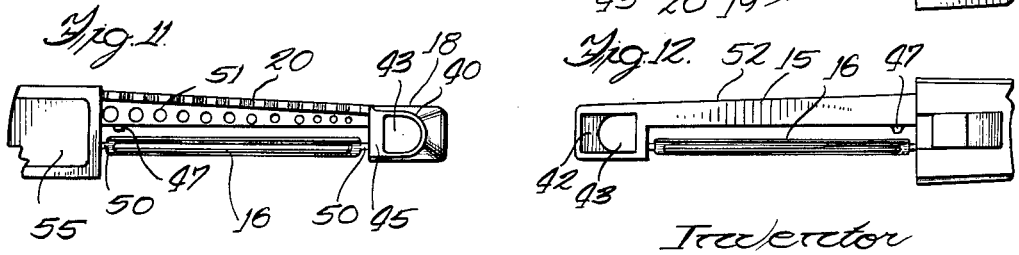
Inventor
Samuel J. Popeil
Dominik, Rudy & Stein
Attorneys Nov. 30, 1965    S. J. POPEIL    3,220,110
FOOD PREPARATION DEVICE
Filed Dec. 26, 1963    3 Sheets-Sheet 3
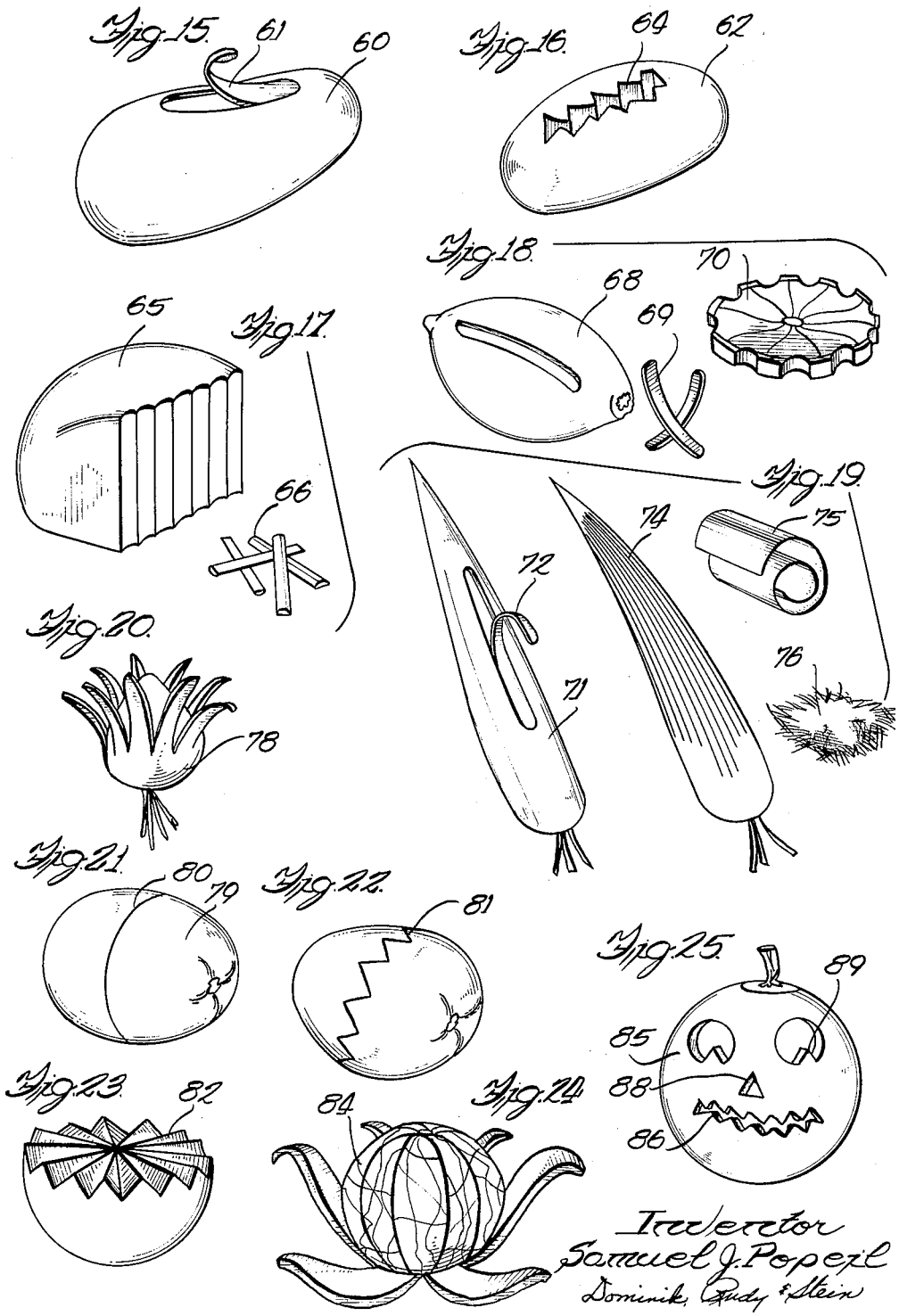

United States Patent Office 3,220,110
Patented Nov. 30, 1965

3,220,110
FOOD PREPARATION DEVICE
Samuel J. Popeil, 2920 N. Commonwealth, Chicago, Ill.
Filed Dec. 26, 1963, Ser. No. 333,368
6 Claims. (Cl. 30—143)

The present invention relates to a food preparation device, and more particularly to an exceedingly light-weight simplified device operated by hand which has a multitude of usages about the kitchen in the preparation of both plain and fancy foodstuffs.

Just a few of the examples of the varying items that can be made with the subject food preparation device are harlequin-cut tomatoes, oranges, melons, and the like. The harlequin-cut presents a scalloped outer edge at the mid-portion of the tomato or citrus fruit or melon to be cut, and proceeds inwardly to present a sort of scalloped wheel-like appearance. In addition, pinwheel type cuts of citrus fruit, such as lemons for use on cold beverages can also be made. Carrot curls are prepared, and can be readily assembled from cuttings made by the food preparation device illustrative of the invention. In addition, the same technique can be employed to make radish roses. For the gentleman in the household, beverage peel slices can be readily made from the outside of a lemon or lime for twisting into popular cocktail beverages. Also, the device can be employed to shred cabbage and carrots, as well as peel potatoes and carrots. In addition, by employing another portion of the device potato eyes can be readily removed. To round out the food preparation talents of the subject device, it is also susceptible of employment to readily peel citrus fruits, such as lemons, and oranges.

Varying devices have been proposed in the past, such as potato peelers, cabbage shredders, and a whole host of kitchen knives. These have invariably had one or two purposes, and oftentimes were quite bulky in operation. In addition, most of the kitchen devices presently commercially available which could be employed, severally, to accomplish the above functions, are composed of many metal parts which are expensive, heavy, oftentimes dangerous to use, and present a whole host of sanitary problems.

In view of the foregoing, it is a principal object of the present invention to provide a food preparation device which is exceedingly small, easy to handle, and will perform a multitude of functions in one structure heretofore unknown. A related object and more detailed in scope, is the provision of a food preparation device which weighs slightly over one ounce, is slightly over six inches long, and yet can cut food-stuffs of almost any size when employed by the average homemaker.

A further object of the invention is to provide a food preparation device with a multiude of uses which is very inexpensive, consists of only four parts, and is simple and easy to assemble in the manufacturing phase, thereby rendering the cost inherently low, and replacement and repair inherently easy.

Still another object of the invention is to provide a food preparation device which is washable, sanitary, and well-ventilated to assist in the inhibition of rust formation and remove unpleasant odors from decaying food which may not be completely washed out by the homemaker.

Still another object of the invention is to provide a food preparation device which is safe in use, light in weight, and may be readily stored without occupying excessive space in the kitchen.

Further objects and advantages of the subject invention will become apparent as the following description of an illustrative embodiment proceeds, taken in conjunction with the accompanying drawings in which:

FIG. 1 is a perspective partially exploded view illustrating the food preparation device illustrative of the present invention showing the removable handle in both positions.

FIG. 2 is an enlarged perspective view of the cutter body illustrating the blade side portion.

FIG. 3 is a perspective view taken from the opposite side of FIG. 2 illustrating the shredder portion of the cutter body.

FIG. 4 is a front elevation assembled view of the cutter assembly.

FIG. 5 is a top view of the cutter assembly illustrated in FIG. 3.

FIG. 6 is an end view of the cutter assembly illustrated in FIGS. 3 and 4 taken from the left end portion thereof.

FIG. 7 is a front end view of the cutter assembly shown in FIGS. 3 and 4 showing the cutting assembly in front on configuration.

FIG. 8 is a front elevational view similar to FIG. 3 with the cutter body portion reversed in order to illustrate the shredder in its exposed position for operation.

FIG. 9 is an end view of the cutter assembly illustrated in FIG. 7 taken from the right end portion thereof and illustrating the strip peeler portion of the unit.

FIG. 10 is a partially sectioned view of the strip peeler portion and shredder showing the blade in front elevation.

FIG. 11 is a bottom view of the threader portion of the cutter body taken from underneath the right hand portion of FIG. 7.

FIG. 12 is reversed end for end from FIG. 10 showing the top portion of the shredder assembly and the strip peeler.

FIG. 13 is an enlarged view of the cutting end piercing teeth taken at 13 in FIG. 4.

FIG. 14 is a transverse enlarged section of the peeler teeth taken at 14—14 of FIG. 2.

FIG. 15 is a view of the potato illustrating a partially cut portion of the peeling.

FIG. 16 is a perspective view of a baked potato cut open for a burst effect of the interior mashed portions.

FIG. 17 is a perspective view of a block of cheese and cheese strips cut therefrom.

FIG. 18 is a view of a lemon from which peeled strips have been cut and showing at the right hand portion thereof a pinwheel slice of the subject lemon.

FIG. 19 is a sequential view illustrating first a strip cut from a carrot, secondly, a carrot after it has been shredded, thirdly, a carrot curl out therefrom, and fourthly the shredded carrot for use in a waldorf salad.

FIG. 20 is a perspective view of a radish cut into a radish rose for decorative purposes on a relish tray.

FIG. 21 shows an orange scribed about its mid-portion for harlequin cutting.

FIG. 22 shows the orange of FIG. 21 after the harlequin is made.

FIG. 23 shows a half of the orange shown in FIGS. 21 and 22 after the sections are parted.

FIG. 24 is another view of an orange peeled by the peeling portion of the subject food preparation device.

FIG. 25 is a view of a jack-o-lantern illustrating how portions of the food preparation device may be used to cut the decorative portion thereof.

The invention relating to the food preparation device 10 will be better understood in the light of the various tasks about the kitchen which it can perform. By referring to the third sheet of drawings in FIGS. 15–24, it will be observed that a whole host of varying cuts and treatments to vegetables and foodstuffs can be made.

For example, in FIG. 15 there is shown a potato 60 from which the peel 61 has been removed. The entire potato may be peeled, or in the case of a cucumber for fancy cut, the peels may be spaced and slices made into a pinwheel configuration. FIG. 16 shows a baked potato 62 which is cut with a harlequin or tooth type cut. The interior may then be removed and mashed up and placed back within the potato, the ends being squeezed in order to create a decorative pattern at the cut 64.

FIG. 17 shows a cheese 65 from which the cheese strips 66 are cut by another portion of the food preparation device. The same portion of the food preparation device which cuts the cheese strips 66 can also be employed to cut a lemon or lime 68 in order to produce the lemon twist strips 69 which are so popular in bar type beverages. After a plurality of the lemon strips 69 have been sliced in parallel fashion from the lemon 68, transverse slices can be made in order to produce a pinwheel lemon slice 70 which can be sliced and placed over an ice tea glass, lemonade, and similar beverages.

FIG. 19 discloses the varying treatments that can be made to a carrot. For example, the carrot 71 can be peeled, the peelings 72 dropping off for disposition. The grated carrot 74 may also be prepared which has an unusual and decorative exterior effect and is simultaneously cleaned and prepared for use. In addition, the heavy cut carrot curl 75 may be cut off from the carrot 71, soaked in water after being prepositioned with a toothpick, and served on a decorative relish tray. The product from the grated carrot 74 as illustrated in the form of shredded carrot 76 may be used in preparing a waldorf salad or similar tasty foodstuffs.

A radish rose 78 such as shown in FIG. 20 can be prepared by using the same portion of the food preparation device as is employed to cut the lemon strips 69 and the cheese strips 66. An inexperienced user can, with very little practice, make perfect radish roses for decorating the relish tray.

FIGS. 21 through 23 show how an orange can be cut into a beautiful harlequin cut. First a girdle 80 is scribed around the orange 79 as shown in FIG. 21. Thereafter, using the scribe line as a guide, the harlequin cut 81 is made as shown in FIG. 22 running around the entire periphery of the orange. Thereafter, as shown in FIG. 23, the two halves need only be separated to display the beautiful harlequin cut face 82 as shown. Additionally, a peeled orange 84 may be prepared as shown in FIG. 24 by using another portion of the food preparation device.

Finally, it will be observed in FIG. 25 that even an additional decorative function can be well served by the subject food preparation device. A jack-o-lantern 85 is there shown in which the teeth 86 are cut with the same portion of the food preparation device as cuts the harlequin cut, the nose 88 is similarly cut or plugged, and even the eye pupils 89 may be cut by using the subject device.

The food preparation device itself forms a completed cutter assembly 10 as illustrated in the upper left hand portion of FIG. 1. The principal portions of the cutter assembly 10 are a removable handle 11 which matingly and in sheath like fashion engages the cutting assembly 21. The cutting assembly 21, as illustrated in the right hand portion of FIG. 1, may be reversed by removingly unsheathing the same, and reversing it end for end and subsequently lockingly unsheathing the cutting assembly 21 again in the removable handle 11.

It will be appreciated that when a busy homemaker is working in the kitchen, a device of this character with its many cutting elements can be somewhat dangerous and cut the fingers. By designing the subject unit in such a manner that it can be readily molded out of plastic, this risk is held to a minimum. Furthermore, the locking assembly which sheathingly engages the handle 11 is such to further reduce the risk of cutting the fingers. These advantages and functions should be borne in mind in connection with the detailed description.

Referring now to FIG. 2, it will be seen that the cutter body 12 has a central hollow handle anchor portion 14. A blade beam 15 extends in one direction from the handle anchor 14, and a V-shaped blade 21 extends in the other direction. The blade beam 15 has a strip peeler 18 at its far end portion which is employed to cut, among other things, the lemon strips 61 as shown in FIG. 18. The construction of the blade beam 15 in cooperation with the strip peeler 18 is such as to support an articulated fluted blade 16 therebetween in strong structural relationship as well as readily available for operation. The blade 16 can cut carrot curls 75, peel carrots 71, or peel potatoes (see FIGS. 15, 19).

Referring now to FIG. 3, it will be seen that the cutting assembly 21 with its V-shaped blade extends in one direction from the handle anchor 14. The blade beam 15 extends in the opposite direction and supports the fluted blade 16 and also a shredder 19 depending from its lower portion and including a plurality of separate depending V-shaped shredder teeth 20. These shredder teeth 20 will shred carrots 76 as shown in FIG. 19.

The cutting assembly 21 with the V-shaped blade is also provided with a peeler 22 at the upper portion or apex of the V-shaped blade. A plurality of peeler teeth 24 appear on one side of the apex of the V-shaped blade as illustrated in FIG. 3, the serrated portions of which protrude slightly over the top of the apex as illustrated in FIG. 2. Because the peeler blade operative teeth are on but one portion of the V-shaped cutting assembly 21, the opposite portion serves to strip the fruit peeling from the fruit body 84 (see FIG. 24).

The peeler teeth as shown in FIG. 14 are formed so that the peeler teeth tops 23 are in the plane of the legs of the cutting assembly 21 and the peeler teeth grooves 27 are cut therebeneath. The peeler teeth back face 17 is undercut from its adjacent leg and is along a vertical face at the center of the cutter assembly 21. Thus, in the vertical plane all of the teeth (see FIGS. 4, 13) project a scalloped or serrated appearance. Similarly scalloped edges are projected in the horizontal plane (see FIG. 5). The peeler teeth 24 are also used for scribing (see FIG. 21) in connection with making the harlequin cut 82.

The cutting teeth 30 (see FIG. 13) having cutting teeth grooves 37 and tops 53 which, because the cutting teeth plane 56 is vertical on the piercing edge 26 and cutting edge 29 (see FIGS. 5, 7), presents a downwardly oriented serrated edge. The peeler teeth tops 23, because of the undercut back face 17, do not cut extensively when the harlequin cut 82 is made. However, when peeling, the peeler teeth back face 17 combines with the peeler teeth 24 to present an effective cutting and deflecting edge.

When the cutter assembly 10 is being employed to cut the harlequin cut 81, 82 such as shown in FIG. 23, the piercing point 25 at the very forward portion of the cutting assembly 21 enters into the orange 79 or other foodstuff first. Thereafter, the piercing edge 26, because its straight edged construction makes a constant rate cut, begins to progressively and uniformly cut to the V-shape cross section of the cutting assembly 21 by means of the vertically oriented piercing teeth 28. After the piercing edge 26 is completely within the item to be harlequin cut, the lower cutting edges 29 with their cutting teeth 30 complete the cut. The peeler 22 and peeler teeth 24 have a minimized cutting action as set forth above. The entire cutting assembly 21 is then injected into the center portion of the food, or until the outer portion of the foodstuffs is engaged by the handle anchor 14.

As referred to above, it is important to be able to remove and reverse the removable handle 11. This is accomplished by means of the releasable lock assembly 31 which includes an upstanding curved finger release portion 32, the front and rear portions of which present curved finger support faces 33. It will be appreciated that the curve readily engages the thumb as the homemaker reverses the removable handle 11. Referring now to FIG. 5 in particular, it will be seen that the forward portion of the tapered handle 11 has a rectangular key slot 35 at its top portion, the same serving as a locking slot 35 to wedgingly and lockingly engage the rectangular locking base 34 of the releasable lock assembly 31.

The utilization of the subject food preparation device will necessarily result in certain retained foodstuffs on various portions of the face and in the teeth which, although undesirable, may remain there for two or three days in the event the unit is not immediately washed after use. By providing the handle end 36 on the removable handle 11 with a plurality of handle vents 38, either the cutting assembly 21 can be permitted to dry if it is within the removable handle 11, or the blade beam portion of the cutter assembly 10 may be permitted to similarly dry and be vented. For purposes of the manufacturer's need in naming the product and otherwise identifying the same, a label recess 39 is provided in the top face of the handle 11.

One of the highly desirable usages of the subject cutter assembly 10 is the strip peeler 18. The strip peeler, as indicated above, is supported at the end portion of the blade beam 15, and its detailed construction is best illustrated in FIGS. 9–12 inclusive. There it will be seen that a semi-circular strip peeler edge 40 is presented at the lower portion of the strip peeler 18, which has an exterior tapered base 41 (see FIG. 9). The peel stripper inner portion 42 tapers away from the taper angle of the tapered base 41 as best illustrated in FIG. 10, and provides that relief in upward motion of the cut peeled portion to permit the same to eject out of the top of the peeler opening 43. The peel guide face 44 is vertical, and is tapered into a rectangular configuration as illustrated in the top view FIG. 11. As pointed out above, the strip peeler 18 makes lemon strips 69, cheese strips 66, radish roses 78, and pin wheel slices 70.

The peeler 18 cooperates with the blade beam 15 in order to support the fluted blade 16. As will be best viewed in FIG. 10, the outer blade support 45 comprises an outer blade notch 46 which is slightly narrower at its open face portion than the interior portion to permit the blade mounting studs 50 to snappingly fit into the outer blade notch 46. The inner blade support 48 is in the handle anchor 14, and comprises a cylindrical hole or recess therein. The inner blade recess 49 (see FIG. 10) is of sufficient size to permit the blade 16 a small degree of longitudinal motion in order to facilitate operation. The blade stop 47 serves to limit the swivel of the fluted blade 16.

The blade beam itself, particularly as viewed in FIG. 11, has a plurality of progressively diminishing in diameter blade beam relief holes 51 in its lower face which serves to lighten the unit without sacrificing any degree of strength. The blade beam outer tapered face 52 blends into the handle portion in smooth tapered relationship as illustrated in FIGS. 3 and 11 especially. The blade beam inner face 54 is parallel with and either along the longitudinal axis of the cutter body 12 or in spaced parallel relationship therewith in order to provide sufficient relief between the fluted blade 16 and the support beam 15 (see particularly FIGS. 11, 12).

The manufacturer of the unit, as may well be appreciated, proceeds by preparing a plastic mold for the 3 plastic parts; namely, the handle 11, the cutter body 12, and the handle anchor base plug 55. While the handle anchor could be made solid, by providing the base plug 55 which snappingly engages the same, the weight of the unit is held to a minimum commensurate with the strength of the design for the multitude of functions achieved. The handle anchor base insert 55 is snap fitted into position. The fluted blade 16 is also snap fitted into position by inserting the blade mounting stud into the handle anchor inner blade recess 49 first, and then snappingly placing the other blade mounting stud 50 into the outer blade notch 46. A suitable label for the cutter assembly 10 is then inserted in the label recess 39 when desired, and the removable handle 11 placed into locking relationship with the releasable lock 31 by engaging the locking base 34 of the cutter body 12 with the locking slot 35 on the removable handle 11. The unit is then ready for boxing, and shipment and ultimate use by the homemakers.

While it will be appreciated that various alternatives, modifications, and equivalent constructions as well as methods may be employed, and further that the mechanisms and methods disclosed and described in detail are illustrative, there is no intention to limit the scope of the invention to the specific disclosure, but rather to refer to the appended claims for a definition of the invention.

What is claimed:

1. A food preparation device comprising, in combination, a central handle anchor, a hollow handle removably and reversibly secured to the anchor, an upwardly extending finger portion on the anchor to facilitate removal of the handle, a stripper beam extending in one direction from the handle anchor, a stripper at the free end of the stripper beam, said stripper having a wall defining a stripper opening generally perpendicular to the axis of the stripper beam, the remote end of said wall tapering centrally to define a cutting edge at one end of the stripper opening, a smooth surface atop the stripper beam to provide a stripper finger pressure point, a V-shaped peeler blade extending in the opposite direction from the handle anchor of the peeler defining an apex at the top of the V from which intersecting blade portions having free edges depend, a plurality of teeth oriented upwardly and extending longitudinally along the peeler blade apex, the forward portions of the depending blade portions of the V-shaped blade tapering to a point at the apex, whereby after stripping the handle may be reversed and peeler point inserted to initiate the action of the peeler teeth to complete the peeling action.

2. A food preparation device as claimed in claim 1 in which the peeler teeth on the V-shaped blade apex are oriented in the plane of one of the depending blades and define an undercut back face and project a scalloped edge.

3. A food preparation device as claimed in claim 1, wherein a stripper wall, a beam wall, and a handle anchor wall define a longitudinal mounting recess, pivotal mounting means in the stripper wall and handle anchor wall, and an articulated fluted blade secured within said mounting means generally parallel with beam wall.

4. A food preparation device as claimed in claim 1, wherein a plurality of shredder teeth depend from the stripper beam along its long axis and remote from the smooth surface atop the stripper beam.

5. A food preparation device as claimed in claim 1 in which a plurality of teeth are provided along the free edges of the blade portions of the V-shaped peeler to facilitate insertion and removal of the peeler in making harlequin designs.

6. A food preparation device as claimed in claim 1 in which the handle anchor has an isosceles trapezoidal cross section insertable within a complementary opening in the handle, and the handle has slot means to nestingly receive upwardly extending finger portion of the anchor.

References Cited by the Examiner
UNITED STATES PATENTS

| | | | |
|---|---|---|---|
| 294,663 | 3/1884 | Parmelee | 7—15 |
| 928,134 | 7/1909 | Konigstein | 30—151 X |
| 959,269 | 5/1910 | Starr | 30—280 |
| 1,117,355 | 11/1914 | Erikson | 30—24 |
| 1,435,514 | 11/1922 | Burns. | |
| 1,448,678 | 3/1923 | Sargent | 30—278 |
| 2,159,299 | 5/1939 | Tanzmann | 30—278 |
| 2,291,179 | 7/1942 | Woginrich | 30—142 |
| 2,507,019 | 5/1950 | Johnson | 30—143 X |
| 2,938,267 | 5/1960 | Tupper | 30—142 |

FOREIGN PATENTS 1,280,928   11/1961   France.

WILLIAM FELDMAN, *Primary Examiner.*

MILTON S. MEHR, *Examiner.*